Feb. 4, 1947.  G. C. SZIKLAI  2,415,226
METHOD OF AND APPARATUS FOR PRODUCING LUMINOUS IMAGES
Filed Nov. 29, 1943  3 Sheets-Sheet 1
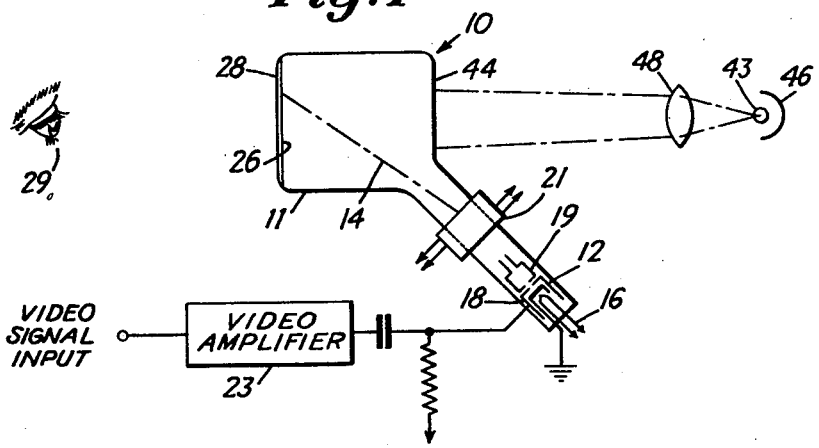
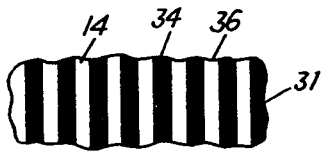
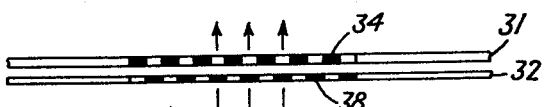
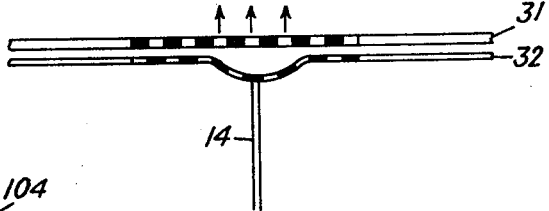
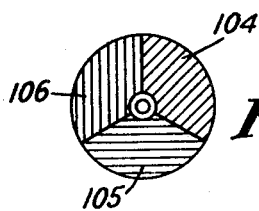
INVENTOR.
GEORGE C. SZIKLAI
BY
*H. S. Grover*
ATTORNEY

INVENTOR.
GEORGE C. SZIKLAI
BY
ATTORNEY

INVENTOR.
GEORGE C. SZIKLAI

Patented Feb. 4, 1947

2,415,226

UNITED STATES PATENT OFFICE 2,415,226

METHOD OF AND APPARATUS FOR PRODUCING LUMINOUS IMAGES

George C. Sziklai, Princeton, N. J., assignor to Radio Corporation of America, a corporation of Delaware Application November 29, 1943, Serial No. 512,160

8 Claims. (Cl. 178—5.4)

The present invention relates to the electrical reproduction of images and more particularly to novel methods of and apparatus for producing a brightly illuminated image which may be viewed directly or projected upon a screen.

The primary object of the present invention is to provide a novel method of and apparatus for producing a brilliantly illuminated image of a picture, field of view, or any other subject matter or image.

Another object of the invention is to provide a novel radiant energy sensitive light controlling device.

A further object of the invention is to provide a novel light controlling element which may be rendered light transmitting in selected areas.

Still another object of the present invention is to provide a novel television picture tube containing a radiant energy sensitive light controlling device for forming images electrically.

A still further object of the invention is to provide a novel television picture tube having a light controlling element which may be rendered light transmitting in selected areas.

A still further object of the invention is to provide a novel television tube having a cathode ray beam sensitive raster.

A still further object of the present invention is to provide a novel television image projection system employing a light source of high intensity to illuminate an electrically reproduced image which is projected on a screen.

A still further object of the present invention is to provide a novel color television system in which unmodulated light is filtered by successively interposed color filters.

Still another object of the present invention is to provide a color television system in which a plurality of sequentially operated light sources of different colors may be employed.

The foregoing and other objects of the invention will appear from the following description of several illustrative embodiments of the invention.

Fig. 1 is a diagrammatic showing of a system embodying the invention in which the reproduced images may be viewed directly;

Figs. 2 to 5 are drawn to an exaggerated scale and illustrate in detail a portion of the apparatus employed in the system of Figs. 1 and 6;

Fig. 11 is a front elevational view of a detail of Fig. 10;

Figure 7:
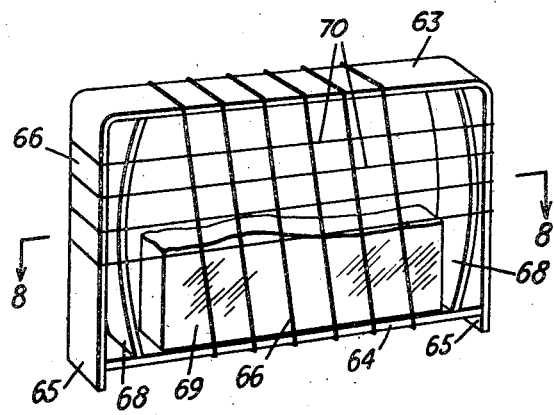
Fig. 7 is a view in perspective of a modified light controlling device, certain of the parts thereof being exaggerated in size for purposes of illustration.

Referring to Fig. 1, there is shown a cathode ray image reproducing tube 10 comprising an evacuated envelope 11 containing an electron gun structure 12 for developing a beam 14 of electrons. The electron gun 12 comprises a heating element 16 for heating a cathode to cause it to emit electrons and form the cathode ray or scanning beam, a grid 18 to control or modulate the intensity of the scanning beam 14, and an anode 19 for accelerating the beam of electrons and causing the electrons to travel toward an impacted target or screen. A deflecting element is shown diagrammatically at 21 and may comprise the usual coils for producing, when suitably energized, horizontal and vertical deflection of the electron beam, or the deflection may result from the application of suitable voltages to electrostatic deflecting plates (not shown) or through the use of a combination of coils and plates (not shown). Video signals representing images of pictures or other subject matter to be viewed with the aid of the tube 10 are applied over any appropriate communication channel to a video amplifier 23, the output of which is connected to modulate the cathode ray beam in any desired manner, such as by the well known connection to the grid 18.

A television system having a fluorescent screen receiver tube arranged in this manner, and apparatus and circuits for obtaining television transmission and reception is shown in a patent to Bedford, 2,192,121, granted February 27, 1940. The deflection and control circuits shown and described therein and in a patent to Vance, 2,137,039, granted November 15, 1938, or in a patent to Tolson et al., 2,101,520, granted December 7, 1937, may be employed in connection with the tube 10 or the tubes in Figs. 9 and 10 of this invention. The various electrodes of the tube 10 are to be supplied as usual with suitable operating potentials which may be done as shown in the mentioned Bedford patent.

The fluorescent screen usually present in a cathode ray receiver tube is replaced in the tube 10 of the present invention by a light controlling arrangement 26. This light controlling arrangement in the embodiment of Fig. 1 is preferably as large in area as the tube face 28 which is to be viewed by an observer 29 at a position in front of the tube 10. A mask having the standard aspect ratio of 4 to 3 may be positioned between the observer 29 and the tube face 28 is desired. Such a mask, which is usually employed in a television receiver, is preferably included to define the viewing field where the previously mentioned light controlling arrangement 26, to be described in detail hereinafter, is substantially smaller in area than the area of the tube face 28.

The light controlling arrangement of the present invention which is indicated in position in the tube 10 of Fig. 1 will now be described in detail in connection with Figs. 2 to 5 of the drawings.

This arrangement comprises a fixed raster 31 and a raster 32 which becomes distorted in a very small area upon an impingement of radiant energy thereon. In the tube of Fig. 1 this radiant energy is obtained from the beam 14 and the small distorted area is selected by moving the beam. Therefore, it will be seen that since the successive positions of the beam are controllable in Fig. 1, the distortion will occur in small selected successive areas.

The fixed raster 31 may, for example be formed on the internal surface of the face 28 of the tube 10, or it may be a separate sheet of transparent or translucent substance such, for example, as glass, mica, transparent or translucent plastics, etc. An opaque substance 34 of any kind is applied to the surface of the material comprising the raster 31. It will be seen from Fig. 2 that this opaque substance is applied in the form of strips 34 so that these strips alternate with transparent or translucent strips 36. This substance may be applied photographically or by any known contact printing process such as typographical or intaglio printing, or by a lithographic process.

The raster 32, which is radiant energy sensitive and, more particularly, physically deformable upon impingement of a cathode ray beam, is preferably in the nature of a thin supported or unsupported film.

As an example, this film forming the raster 32 may be 1/50,000 of an inch thick for good results in picture or image reproduction. It will be understood, however, that the figure given is not intended as limiting the invention. The thickness may vary within wide limits, depending on the use to which the invention is to be put. Other factors, such as the radiant energy beam intensity, will be considered in determining the raster thickness and other properties thereof for a given use.

The material of which the film for the raster 32 is composed is selected primarily in view of its high temperature constant of expansion. The film may be composed of cellulose acetate, cellulose nitrate, or a film of gelatin. A liquid known as "Parlodeon," obtainable commercially, gives good results in practice.

In preparing the film with "Parlodeon," the commercially obtainable liquid may be poured on water so that it forms a thin film on the surface of the water. This thin film may be lifted from the surface of the water upon which it floats. Cellulose acetate and cellulose nitrate are obtainable commercially in thin film form, and self-supporting gelatinous films are also obtainable.

The raster 32, however it may be produced, is provided with alternate opaque marks or strips 38, alternating with the strips 39 of the exposed transparent or translucent film material. The coating material 38 is preferably black so that it will absorb a maximum amount of energy from a radiant energy source and cause heat expansion of the film material composing the raster 32.

The raster 31 and the raster 32 are superimposed one on the other so that under normal, unexcited conditions the opaque strips 38 overlie the transparent strips 36 of the fixed raster 31. If the material of the tube face 28 constitutes the fixed raster 31, the opaque strips 34 preferably will be applied as stated above to the inside face. The opaque strips 38, in case they are printed only on the surface of the raster 32, preferably are on the face opposite to the face which is in contact with the raster 31. Where the opaque strips 38 strike into the material of the raster 32 so as to substantially impregnate it, it is then immaterial which face of the raster 32 is in contact with the fixed raster 31. The thinness of the raster film 32 prevents any substantial amount of light diffusion even though the opaque strips 38 are spaced from the strips 36 by the depth of material forming the raster 32.

The respective positions of the fixed or stable raster 31 and the distortable raster 32 are illustrated in Figs. 4 and 5. For purposes of illustration, the strips 34 and the strips 38 are shown as completely impregnating the material of each raster. However, as pointed out above, it will be sufficient for the general purpose of the invention if these strips are merely printed upon the surface of each raster.

Figs. 4 and 5 taken together in conjunction with Fig. 1 illustrate the principle of operation of the light controlling arrangement 26. With a light controlling arrangement in the position in the tube 10 shown by Fig. 1, light from a suitable light source 43 is projected through the transparent wall 44 of the tube on to the light controlling arrangement. A reflector 46 and light condenser lens 48 concentrates the light and also insures a uniform distribution of the light on the surface of the device 26.

Referring to Fig. 4, when the beam 14 is not incident on the raster 32, the opaque strips 38 and 34 will block the light so that an observer at 29 will see a dark screen. When the beam 14 is incident on a given spot on the raster 32, the material of the raster will expand, because of the effect of the generated heat, permitting light from the source 43 to pass through the device in a small area. This will be seen by the observer 29 as a spot of light, the intensity of which will vary in accordance with the amount of heat generated by the beam 14. It will be understood that the beam 14 not only sweeps across the device 26 to scan it but is modulated in accordance with video signals by the grid 18.

The individual raster or grating elements 34 and 38 may be much less than the width of the scanning line of the picture. In any case, they would not exceed the same order of magnitude of dimensions. This may be accomplished photographically in the manner set forth below so that accurate placing of the strips is obtained. The scanning spot itself, which is indicated in outline on Fig. 2 of the drawings by the reference character 14, may be made smaller than is necessary for the corresponding scanning-line width for such television pictures. In order to allow for the expansion effect caused by the opaque thermal expansion, the scanning spot itself may be helical in section, thus having its major dimension parallel to the direction of motion of the spot.

The front and rear rasters or screens 31 and 32 may, in any case, be maintained or contracted as a unitary structure on a substantial framework to obtain initial alignment fixed during manufacture, and to maintain such alignment.

The lines on each raster within the aspect opening may be greater in number than the number of horizontal lines into which the image of the viewed subject is divided or the horizontal lines multiplied by the aspect ratio in which case the vertical line structure of the device 26 will not limit the resolution to a greater degree than it is limited by the horizontal lines.

By selection of a material for the sensitive raster 32 with respect to its thermal capacity or by providing a given degree of cooling or by providing a combination of these two characteristics, different degrees of persistence of image may be obtained. For rapid cooling, the tube 10 may be provided with cooling fins.

Correction for keystoning of the image may be obtained by tilting the light controlling device 26.

As has been disclosed above, it is possible to provide lines 34 and 38 upon the raster 31 or the raster 32 by a photographic process. In order that this may be done accurately, a relatively large screen may be provided which has alternate dark and light strips of suitable width thereon. A much reduced image of this screen or a portion of it may be projected upon a sensitized sheet of material which is to be used for either of the rasters and the latent photographic image may then be developed so as to provide alternate dark strips and transparent strips which have the desired degree of fineness in spacing and in width.

One convenient way of preparing the light sensitive raster 32 is to use the emulsion film from a photographic plate or photographic film. This emulsion film is usually of gelatin, impregnated with grains of a light sensitive silver compound. After exposure and development, the black lines or strips are of high density and hence of great opacity.

Figure 6:
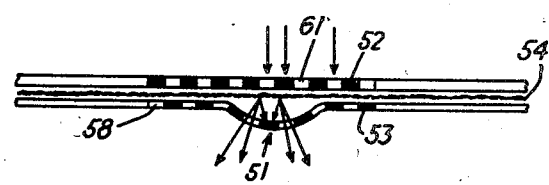
Fig. 6 is a view similar to Fig. 5, but showing a modification.
Figure 9:
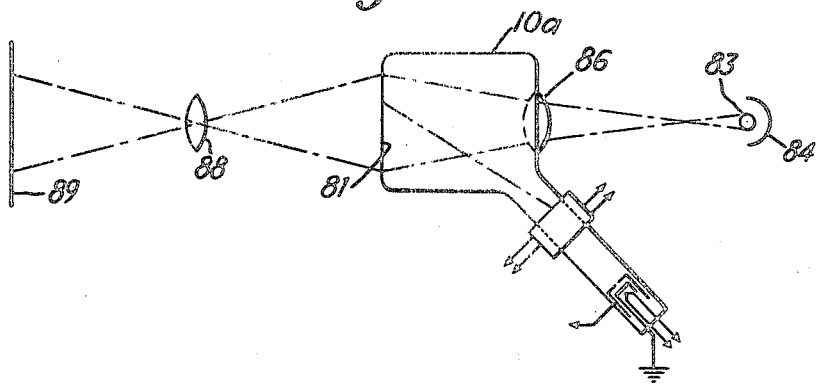
Fig. 9 is a view similar to Fig. 1 but showing a modified arrangement for projecting images on a screen.
Figure 10:
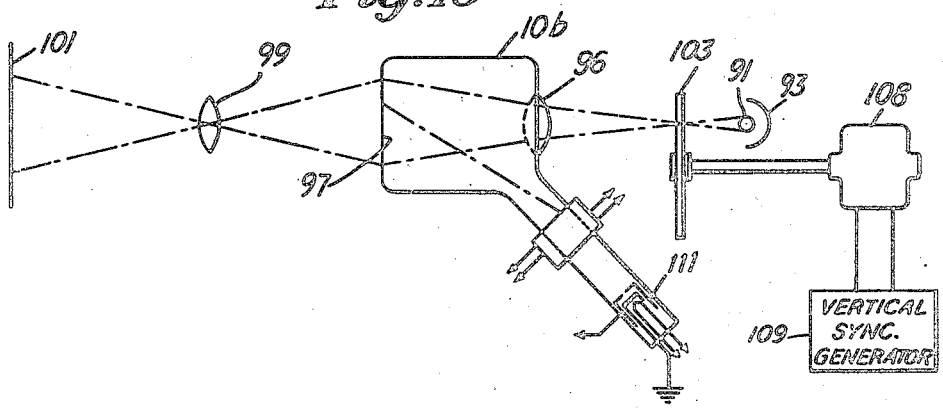
Fig. 10 is a diagrammatic showing of an arrangement in accordance with the arrangement for reproducing images in color.

Fig. 6 of the drawings shows a modification of the light controlling device 26 which may be employed in the tube 10 of Fig. 1 in the manner previously pointed out, or in the tubes 10a or 10b of Figs. 9 or 10. This light controlling device, designated in its entirety by reference character 51, comprises a relatively fixed raster 52 similar to the fixed raster 31 of Figs. 2, 4, and 5 and a physically distortable raster 53 similar to the distortable raster 32 of Figs. 3, 4, and 5.

A diffusing translucent layer 54 is placed between these rasters so as to diffuse the light which is projected through the device 51 to create an image. The image composed of this diffused light may be viewed directly by an observer or may be projected on a screen similar to the screen 61 of Fig. 6. This diffusing translucent layer 54 may be, for example, an extremely thin sheet of frosted mica. Light passing through this diffusing layer will be broken up somewhat in accordance with Lambert's law, and Fig. 6 suggests by the arrows the additional light which will be emitted through the transparent portions 58 of the raster 53 after passing through the transparent portions 61 of the raster 52. The diffusing layer 54 may be placed between the light source and the light controlling device 51.

Figure 8:
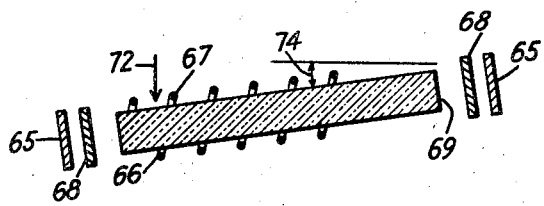
Fig. 8 is a horizontal section taken on line 8 of Fig. 7.

Figs. 7 and 8 of the drawings show a still further modification of the light controlling device of the invention in which strands or wires are employed as the physically distortable members which are distorted upon impingement of a cathode ray scanning beam and as the stationary grating elements. This light controlling device of Figs. 7 and 8 may be installed in the tube 10 of Fig. 1 or the tubes 10a and 10b of Figs. 9 and 10.

A metal frame comprising top and bottom members 63 and 64 and end members 65 forms the principal support for the light controlling strands 66 and 67. The bottom member 64 is shown as being free to move with respect to the top member 63, the end members 65 serving as guides. Spring pressure elements 68 react between the top and bottom members to maintain the strands 66 under tension.

It will be understood that the top and bottom members 63 and 64 of the frame are very narrow and that the end members 65 are likewise very narrow. Their width is exaggerated on Figs. 7 and 8 for the sake of ease of illustration.

Fig. 8 of the drawings, which is a sectional view, shows that strands 66 are positioned with respect to strands 67 so that light passing between the strands 67 is interfered with or cut off by the strands 66.

One convenient way of placing the strands 66 and 67 in their desired relative position is by winding a single wire or very thin metal ribbon helically upon the frame. This wire or ribbon is preferably much less in diameter or width than the width of the scanning lines of the image which is to be reproduced. In any case, the raster or grating elements should not exceed the same order of magnitude of dimensions. The scanning beam will be moved in a direction which is generally parallel to the members 63 and 64.

A light conducting member 69, which may, for example, be of mica, separates the strands 66 from the strands 67. This member may be transparent or may be frosted similar to the member 54 of Fig. 6 so as to have a diffusing effect upon light which is transmitted upon physical distortion of the strands or wires 66 with respect to the strands or wires 67.

The strands 66 and 67 may be held in position by relatively thin horizontal wires 70 which will serve to hold the strands 66 and 67 in position, yet permitting physical bending of any strand 66 throughout a limited portion of its length when it is impinged upon by the scanning ray beam. The tension in the strands 66 may be such that the natural period of vibrations of these strands is comparable to the rate of traversal by the scanning beam. This will enhance the effect of the cathode ray beam in physically distorting the strands 66.

The wire which is helically wound on the frame to provide the strands 66 and 67 may be spot welded to the frame members 63 and 64 if desired for certain uses of the light controlling member of Figs. 7 and 8.

Referring to Fig. 8, it will be noted that the direction of the light is indicated by rays 72, which are assumed to be normal to the optical axis of the viewing system in which the light control device is used. The light control device may be tilted through a small angle 74 to a line normal to these rays when the insulating member 69 is transparent so that little or no light is passed by the gratings composed of the strands 66 and 67 except when one of the strands 66 is distorted by radiant energy.

Where the normal tension in the strands 66 and 67, produced by winding the wire of which they are composed on the frame, is deemed sufficient, the resilient members 68 may be omitted, and the end frame members 66 may be joined to the top and bottom members 63 and 64 so that the frame is a unitary rigid structure. The light transmitting member 67 may then be held rigidly in contact with the top and bottom members 63 and 64.

Fig. 9 of the drawings shows an arrangement in accordance with the invention for projecting images of high luminous intensity upon a screen. The tube 10a is or may be substantially the same as the tube 10 of Fig. 1 and is provided with a radiation sensitive device indicated by reference character 81, which is similar to the double raster radiation sensitive light controlling device 26 of Fig. 1. Light source 83 within a reflector 84 produces a beam of light which is projected upon the device 81 by a lens 86. This last named lens may be formed integral with the material of the tube envelope or it may be secured in the envelope wall. A projecting lens or lens combination 88 throws an image of the device 81 or at least luminous parts thereof, on a screen 89, the image on the screen 89 will, for mass entertainment purposes, be considerably enlarged. The screen 89 may, in fact, be the screen of a motion picture theatre, already equipped with a sound reproducer for reproducing the sound accompanying the television program.

It will be understood that the diagrammatic showing on Fig. 9 is not intended to indicate with accuracy the optical train involved or the relative sizes of the parts. For example, the screen and the image on the screen may be very large in proportion to the total area of the device 81.

From the description already given of Fig. 1 of the drawings, it is believed that the operation of the arrangement of Fig. 9 may be readily understood.

Figs. 10 and 11 of the drawings indicate diagrammatically the application of the system of Fig. 1 or Fig. 9 to reproduction of television or other electrically reproduced images in colors. The tube 10b is or may be similar in all respects to either the tube 10 or the tube 10a. A light source 91 in combination with a reflector 93 and a condensing lens 96 provides a beam of light upon the radiation sensitive device 97 which is or may be like the device 26 described above in detail in connection with Fig. 1 of the drawings. A projection lens or lens combination 99 projects an image of the light controlling device 97 on the viewing screen 101. For direct viewing of images reproduced in color, the lens combination 99 and the screen 101 may be omitted. The optical train then may be substantially as shown in Fig. 1 of the drawings. It is necessary only that the cross section of the beam of light in the plane of the changeable filter be of suitable area and so positioned as to be properly filtered.

A rotary filter 103 is shown by way of example, and it will be noted that this filter, in accordance with this aspect of the invention, is positioned so that it chops and filters the unmodulated beam from the light source 91 by means of the filter sections 104 to 106 (Fig. 11). Heretofore, in systems for reproducing television images in color, it has been necessary to chop and filter the image modulated beam.

In the three color television system, selected by way of example, for illustrating the application of this invention to color television, the filters normally used are colored red, green, and blue, and as the rotary filter 103 is rotated by a motor 108, light of these different colors is projected successively on the light controlling device 97. The motor 108 is shown as being connected to the vertical deflection generator 109 since it is necessary that the motor be driven in synchronism with the vertical deflection of the cathode ray beam. In some instances, however, the power of the motor may be derived from an entirely separate source, and impulses from the vertical deflection generator may be used in synchronizing the motor or in controlling its speed.

The equipment for sequential scanning of the original in different colors is not disclosed herein since it does not form a part of the present invention. It will be understood that any system of scanning may be employed for applying a series of signals to the grid 111 of the tube 10b in timed relationship with the presentation of the colored sectors 104 to 106 or their equivalent. An arrangement for effecting this purpose is shown in Patent No. 1,748,883 to R. D. Kell, granted February 25, 1930. A cathode ray color television transmitter is shown in Patent No. 2,297,524 to E. I. Anderson, granted September 29, 1942.

Figure 12:
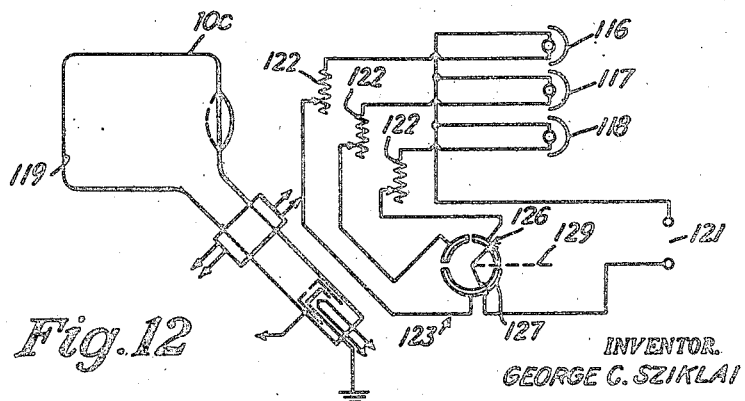
Fig. 12 shows diagrammatically a modification of the apparatus of Fig. 10.

Fig. 12 of the drawings shows a slight modification of the arrangement of Fig. 10. With this modification of the invention, possible lack of uniformity in the response of the system to different colored lights may readily be compensated for at the receiver. In this manner it is possible to obtain the color balance which will give the most pleasing color effect of the picture projected on a screen 114 by the picture reproducing tube 10c. The apparatus is generally similar to that already described in connection with Fig. 10 of the drawings except that individual sources of colored light 116, 117, and 118 are employed in place of a single light source and the changeable filter. These individual light sources may, it will be understood, comprise a set of two or more lights depending on the number of colors which are to be blended to obtain a colored reproduction of the original.

The light beams from these separate sources are projected upon the light controlling device 119 of the tube 10c by any desired optical train. It is preferred that the light beam from each of these sources has a common axis in the path from the light controlling device 119 to the screen 114. This may be accomplished by prismatic or other optical means.

The light sources may be fed from a common current source 121, and each individual light source is provided with an intensity control means, for example, a rheostat 122. Suitable means may be provided for sequentially causing illumination of the light sources 116 to 118 in synchronism with a similar control at the transmitter. An arrangement for accomplishing this purpose is shown by way of example as a mechanical distributor 123 having a brush 126 and one segment 127 for each of the light sources. The drive shaft 129 of the commutator may be driven by a synchronous or other speed controlled type of motor such as the motor 108 of Fig. 10 which operates at a speed determined by the vertical deflecting pulses controlling the vertical deflection of the cathode ray beam in the tube 10c.

While a mechanical commutator has been shown for producing sequential illumination of the light sources 116 to 118, it will be understood that any similar timing device such as an electronic timer or commutator may be employed. Moreover, the light sources may each be in the form of a fluorescent lamp emitting light of the selected color. The advantage of such an arrangement is that these lamps will have no thermal lag and successive periods of illumination on the screen will be sharply defined with respect to time. The light sources may be incandescent lamps, fluorescent lamps, or any type of gaseous discharge lamps, each equipped with a color filter if desired.

Various modifications of the system shown and described herein by way of example are possible, without departing from the spirit and scope of the invention described herein, and it is desired that any and all of such modifications be considered within the purview of the present invention defined by the hereinafter appended claims.

Having now described the invention, what is claimed and desired to be secured by Letters Patent is the following:

1. A multiple light valve comprising a relatively undistortable screen having alternate opaque and light transmitting portions, and a second screen having alternate opaque and light transmitting portions, said second screen being formed of a material which is distortable upon the application of heat thereto, said screens being superposed with the opaque portions of one overlying the light transmitting portions of the other.

2. A multiple light valve comprising a relatively stationary screen composed of spaced light obstructing sections, and a second screen composed of spaced light obstructing sections, said light transmitting sections of said second screen being formed of a material which is distortable upon the application of heat thereto, said screen being superposed with the spaced light obstructing portions of one being staggered with respect to the light obstructing portions of the other.

3. The light valve of claim 2 wherein a light diffusing member is interposed between said screens.

4. A multiple light valve comprising alternate fixed and distortable light obstructing sections, and means to produce distortion in selectable portions of said light obstructing sections.

5. The multiple light valve of claim 4 in which said light obstructing sections are composed of strands of wire, and in which an insulating member is disposed so as to shield alternate strands of said wire whereby distortion of said shielded strands is prevented.

6. The multiple light valve of claim 4 in which said light obstructing sections are composed of strands of wire, and in which an insulating member is disposed so as to shield alternate strands of said wire whereby distortion of said shielded strands is prevented, said insulating member being formed of a light diffusing material.

7. A system for producing colored television images comprising a plurality of colored light sources of separately controllable intensity, a multiple light valve responsive to radiant energy, means for directing light from said sources successively and cyclically on said light valve, means for projecting light passed by said light valve in the form of a perceivable image, means for directing a beam of image signal modulated radiant energy onto said multiple light valve, means to cause said beam to scan said multiple light valve, and means for timing successive scannings in step with the occurrence of successive illumination of said light valve.

8. A multiple light valve comprising spaced sections expandable upon application to heat thereby to be responsive to radiant energy, and staggered light stopping means effective in combination with said spaced sections to permit passage of light only upon energization of said sections by radiant energy.

GEORGE C. SZIKLAI.

REFERENCES CITED

The following references are of record in the file of this patent:

UNITED STATES PATENTS

| Number | Name | Date |
|---|---|---|
| 2,042,859 | Nicolson | June 2, 1936 |
| 2,029,300 | Arfsten | Feb. 4, 1936 |
| 2,175,692 | Iams | Oct. 10, 1939 |
| 1,888,893 | Tschorner | Nov. 22, 1932 |
| 1,933,267 | Keith | Oct. 31, 1933 |
| 2,185,379 | Myers | Jan. 2, 1940 |
| 2,281,280 | Gabor | Apr. 28, 1942 |
| 2,301,254 | Carnahan | Nov. 10, 1942 |
| 2,307,188 | Bedford | Jan. 5, 1943 |
| 2,246,001 | Powers | June 17, 1941 |
| 2,330,172 | Rosenthal | Sept. 21, 1943 |